United States Patent [19]
Jacobs

[11] Patent Number: 5,362,028
[45] Date of Patent: Nov. 8, 1994

[54] HIGH SPEED GATE VALVE

[75] Inventor: Jordan N. Jacobs, Randolph, Mass.

[73] Assignee: Fenwal Safety Systems, Inc., Marlborough, Mass.

[21] Appl. No.: 242,657

[22] Filed: May 13, 1994

Related U.S. Application Data

[63] Continuation of Ser. No. 59,094, May 10, 1993, abandoned.

[51] Int. Cl.⁵ .............................. F16K 3/30
[52] U.S. Cl. ...................... 251/327; 251/64
[58] Field of Search ......... 251/64, 63.5, 327; 137/68.2

[56] References Cited

U.S. PATENT DOCUMENTS

| | | |
|---|---|---|
| 3,799,191 | 3/1974 | Burkhardt et al. ............. 251/327 X |
| 3,810,485 | 5/1974 | Gawlick et al. .................. 251/64 X |
| 3,980,094 | 9/1976 | Schroder et al. .................. 137/68.2 |
| 4,103,863 | 8/1978 | Houlgrave et al. ............ 251/63.5 X |
| 4,647,005 | 3/1987 | Hunter .............................. 251/327 X |

Primary Examiner—John Fox
Attorney, Agent, or Firm—John E. Toupal; Harold G. Jarcho

[57] ABSTRACT

A gate valve including a valve housing defining an inlet and an outlet aligned therewith; the housing having a planar inlet surface surrounding the inlet and a planar outlet surface surrounding the outlet and parallel to, facing and spaced a given distance from the inlet surface; a gate plate having a uniform thickness substantially equal to the given distance and defining a throughput opening, the gate plate mounted for sliding movement between the inlet and outlet surfaces and between an open position wherein the throughput opening is aligned with the inlet and outlet and a closed position wherein the throughput opening is substantially transversely displaced from the inlet and outlet; and an actuator for producing movement of the gate plate between the open and closed positions.

20 Claims, 3 Drawing Sheets

HIGH SPEED GATE VALVE

This is a continuation of copending application Ser. No. 08/059,094 filed on May 10, 1993 now abandoned.

BACKGROUND OF THE INVENTION

This invention relates generally to a gate valve and, more particularly, to a gate valve capable of extremely fast operation.

Many processing systems employ pipelines to transport potentially hazardous materials. Under certain circumstances, safety can require a rapid interruption of material flow and isolation of a hazardous condition. The gate valve is a device often used for this purpose and such use of a gate valve is disclosed, for example, in U.S. Pat. No. 4,103,863. However, prior gate valves have not been satisfactory under conditions requiring extremely fast valve closure and process material isolation. Such fast operation is necessary, for example, to isolate process materials from flame produced by an inadvertent explosion. Depending on pipe size and the volatility of the transported material, necessary valve closure times for explosion isolation generally range from 10–50 milliseconds. Because of the significant requirements for energy development and dissipation, conventional gate valves are not suited for operation in that range.

The object of this invention, therefore, is to provide an improved gate valve capable of the extremely fast closure speeds necessary to isolate certain types of explosions.

SUMMARY OF THE INVENTION

The invention is a gate valve including a valve housing defining an inlet and an outlet aligned therewith; the housing having a planar inlet surface surrounding the inlet and a planar outlet surface surrounding the outlet and parallel to, facing and spaced a given distance from the inlet surface; a gate plate having a uniform thickness substantially equal to the given distance and defining a throughput opening, the gate plate mounted for sliding movement between the inlet and outlet surfaces and between an open position wherein the throughput opening is aligned with the inlet and outlet and a closed position wherein the throughput opening is transversely displaced from the inlet and outlet and an actuator for producing movement of the gate plate between the open and closed positions. Extremely fast valve closure is accommodated by the provision of a gate plate with an throughput opening and planar inlet and outlet surfaces that establish face-to-face seals in the valves closed position.

According to features of the invention, the throughput opening is substantially displaced in the closed position from the inlet and outlet and the actuator produces on the gate plate a closure force having only components parallel to the inlet and outlet surfaces. Fast gate plate travel is facilitated by the absence of transverse forces thereon and the gate plate overtravel associated with the substantial throughput opening displacement facilitates dissipation of kinetic energy.

According to other features of the invention, each opposite surface of the gate plate defines first and second spaced apart annular gate sealing surfaces that sealingly engage the planar inlet and outlet surfaces in, respectively, the open and closed positions. This arrangement desirably isolates process materials in both open and closed positions of the valve.

According to another feature of the invention, the inlet opening, the outlet opening and the throughput openings are equal sized circles. This arrangement prevents abrasive gate plate wear in the open position.

According to other features of the invention, the actuator produces rectilinear movement of the gate plate between its open and closed positions, the throughput opening has a maximum width in the direction of rectilinear movement, and in the closed position of the gate plate the throughput opening is transversely displaced from the inlet and the outlet by a distance equal to at least 5% of the maximum width and preferably greater than 20% thereof. The provision of substantial overtravel facilitates dissipation of energy during a closure cycle.

According to yet another feature, the valve includes a resilient stop for engaging the gate plate in its closed position. The stop induces deceleration of the gate plate and thereby dissipates the momentum thereof.

According to further features of the invention, the housing defines an annular inlet cavity surrounding the inlet surface, and the valve includes an annular inlet seal retained in the annular inlet cavity and engaging the gate plate. The seal created between the gate plate and the inlet seal prevents clogging of the gate plates travel path with process matter.

According to additional features of the invention, the housing further defines an annular outlet cavity surrounding the outlet surface and aligned with the annular inlet cavity, and the valve includes an annular outlet seal retained in the annular outlet cavity and engaging the gate plate. Desirable redundant sealing is established by the additional provision of the outlet seal.

According to still other features of the invention, the actuator includes a hydraulic cylinder, a piston slidably retained within the cylinder and coupled to the gate plate, and a source of pressurized gas communicating with the cylinder. High speed gate plate closure is facilitated by this arrangement.

According to further features of the invention, the housing includes an inlet plate defining the inlet and the inlet surface, an outlet plate defining the outlet and the outlet surface, and a plurality of side plates attached between the inlet and outlet plates so as to establish the given distance between the inlet and outlet surfaces. The use of housing plates reduces cost and facilitates custom valve fabrication.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
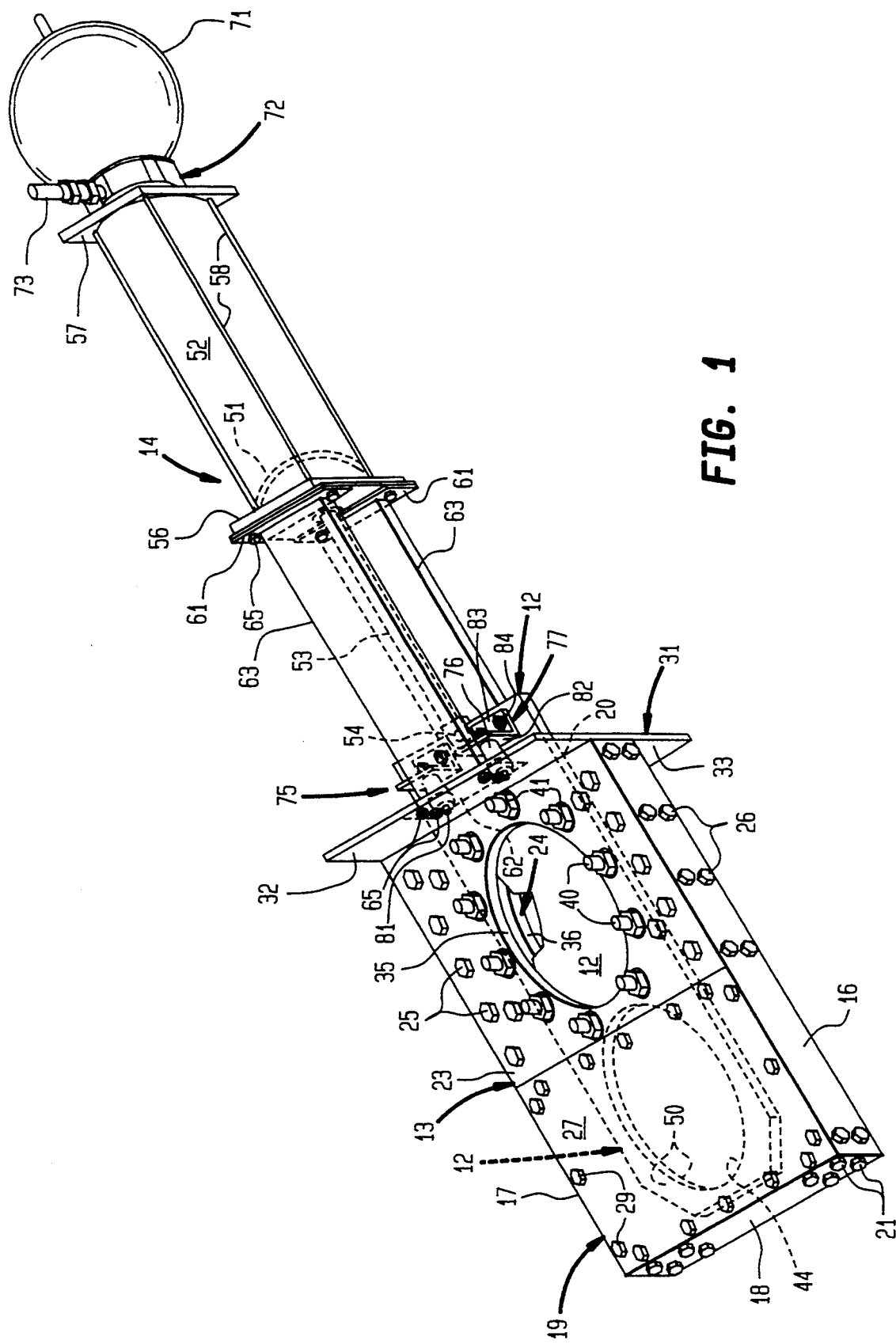
FIG. 1 is a perspective view of a gate valve according to the invention.

A gate valve 11 includes a gate plate 12 received by a valve housing 13 and mechanically coupled to an actuator mechanism 14. Adjacent ends of a pair of side plates 16, 17 are joined to opposite ends of another side plate 18 to form a rectangular enclosure 19. The side plates 16-18 are secured together by threaded bolts 21. Covering one half of the rectangular enclosure 19 are a top inlet plate 23 and a bottom outlet plate 24 secured together by bolts 25 and secured to the side plates 16, 17 by bolts 26. The other half of the rectangular enclosure 19 is covered by upper and lower cover plates 27, 28 secured to the side plates 16-18 by threaded bolts 29. Disposed opposite to the side plate 18 and secured to the side plates 16, 17 and the inlet and outlet plates 23, 24 is an end plate 31 having an upper portion 32 that extends above the inlet plate 23 and a lower portion 33 that extends below the outlet plate 24. A central opening 20 in the end plate 31 accommodates movement of the gate plate 12 into the housing 13.

Defined by the inlet plate 23 is a circular inlet opening 35 that is concentrically aligned with a circular outlet opening 36 defined by the outlet plate 24. The inlet opening 35 is surrounded by an annular planar inlet surface 38 formed by the inner surface of the inlet plate 23. Similarly, the outlet opening 36 is surrounded by an annular planar outlet surface 39 formed by the inner surface of the outlet plate 24. The planar inlet surface 38 is parallel to the planar outlet surface 39 and spaced therefrom by a uniform distance d. Extending around the inlet opening 35 is a circular array of threaded apertures 41 formed in the outer surface of the inlet plate 23. A similar array of threaded apertures 42 are formed in the outer surface of the outlet plate 24 and surround the outlet opening 36. The threaded apertures 41, 42, respectively, accommodate bolts 40 utilized to secure flanges (not shown) of inlet and outlet pipes communicating with the inlet and outlet openings 35, 36. Also formed in the inner surface of the inlet plate 23 and surrounding the inlet surface 38 is an annular inlet cavity 46 that retains an annular inlet seal 47. Similarly formed in the inner surface of the outlet plate 24 and surrounding the outlet surface 39 is an annular outlet cavity 48 aligned with the inlet cavity 46 and retaining an annular outlet seal 49. The inlet and outlet seals 47, 49 sealingly engage, respectively, the upper and lower surfaces of the gate plate 12.

The gate plate 12 is mounted for sliding movement between the inlet and outlet plates 23, 24 and has a uniform thickness substantially equal to the spacing d between the planar inlet and outlet surfaces 38, 39. Formed in an inner half of the gate plate 12 is a circular throughput opening 44 having a diameter equal to those of the inlet and outlet openings 35, 36. In response to operation by the actuator mechanism 14, the gate plate 12 can be moved from an open position to a closed position. In its open position (not shown) the gate plate 12 is partially withdrawn from the valve housing 13 and the throughput opening 44 is aligned with the inlet and outlet openings 35, 36 so as to allow fluid communication between the inlet and outlet pipes (not shown) attached, respectively, to the inlet and outlet plates 23, 24. However, first annular gate seal surfaces 50 surrounding the opening 44 on opposite sides of the gate plate 12 isolate the communicating fluid. Conversely, in its closed position shown in FIGS. 1-3, the gate plate 12 projects completely within the valve housing 13 so as to move the throughput opening 44 into a portion of the rectangular closure 19 spaced from the inlet and outlet openings 35, 36. In that closed position, second annular gate seal surfaces 60 on opposite sides of a solid one-half portion of the gate plate 12 are engaged between the planar inlet and outlet surfaces 38, 39 creating a face-to-face seal that prevents communication between the inlet and outlet pipes and isolates the fluid in the inlet pipe (not shown).

The actuator mechanism 14 includes a reciprocating piston 51 disposed within a pneumatic cylinder 52 and having a piston rod 53 with an outer end attached to an outer end of the gate plate 12 by a bolt 54. Mounting plates 56, 57 at opposite ends of the cylinder 52 are secured together by spacer rods 58. In addition, flanges 61, 62 fixed to opposite ends of spacer plates 63 are secured, respectively, to the end plate 31 and the inner mounting plate 56 by bolts 65. A pressurized gas bottle 71 is connected to the pneumatic cylinder 52 by a petalling burst disc assembly 72 that retains an explosive squib 73. In response to detonation of the squib 73 the closure assembly 72 opens to provide communication between the bottle 71 and the pneumatic cylinder 52. An example of a suitable frangible closure assembly is disclosed in U.S. Pat. No. 3,523,583.

Also included with the gate valve 11 is an energy dissipation assembly 75 including a plurality of resilient bumper stops 76 and a plurality of bracket stops 77. The bumper stops are formed of a suitable resilient elastomer and are secured to spaced apart positions on the outer surface of the end plate 31 by threaded fasteners 81. Longitudinally aligned with each of the bumper stops 76 is an engagement portion 82 of one of the bracket stops 77. Securement portions 83 of the bracket stops 77 extend perpendicular to the engagement portions 82 and are secured to the gate plate 12 by threaded bolts 84.

OPERATION

During normal operation, the gate plate 12 is in its open position partially withdrawn from the valve housing 13. In that position, the throughput opening 44 is aligned with the inlet and outlet openings 35, 36 allowing fluid flow between inlet and outlet pipes (not shown) secured, respectively, to the outer surface of the inlet and outlet plates 23, 24. The annular inlet and outlet seals 49 prevent leakage of process fluid that could clog the travel path of the gate plate 12 and the annular cavities 46, 48 can be pressure tested to verify seal integrity.

In response to the detection of a system abnormality by a conventional control system (not shown), the explosive squib 73 is detonated to open the closure assembly 72 and allow discharge of the pressurized gas bottle 71 into the cylinder 52. Increased pressure within the cylinder 52 forces the piston 51 and its rod 53 outwardly moving the attached gate plate into its inner closed position shown in FIG. 1. In that closed position seals are created between the second annular gate seal surfaces 60 on the solid outer half of the gate plate 12 and, respectively, the engaged annular planar inlet and outlet surfaces 38, 39 of the inlet and outlet plates 23, 24.

Figure 2:
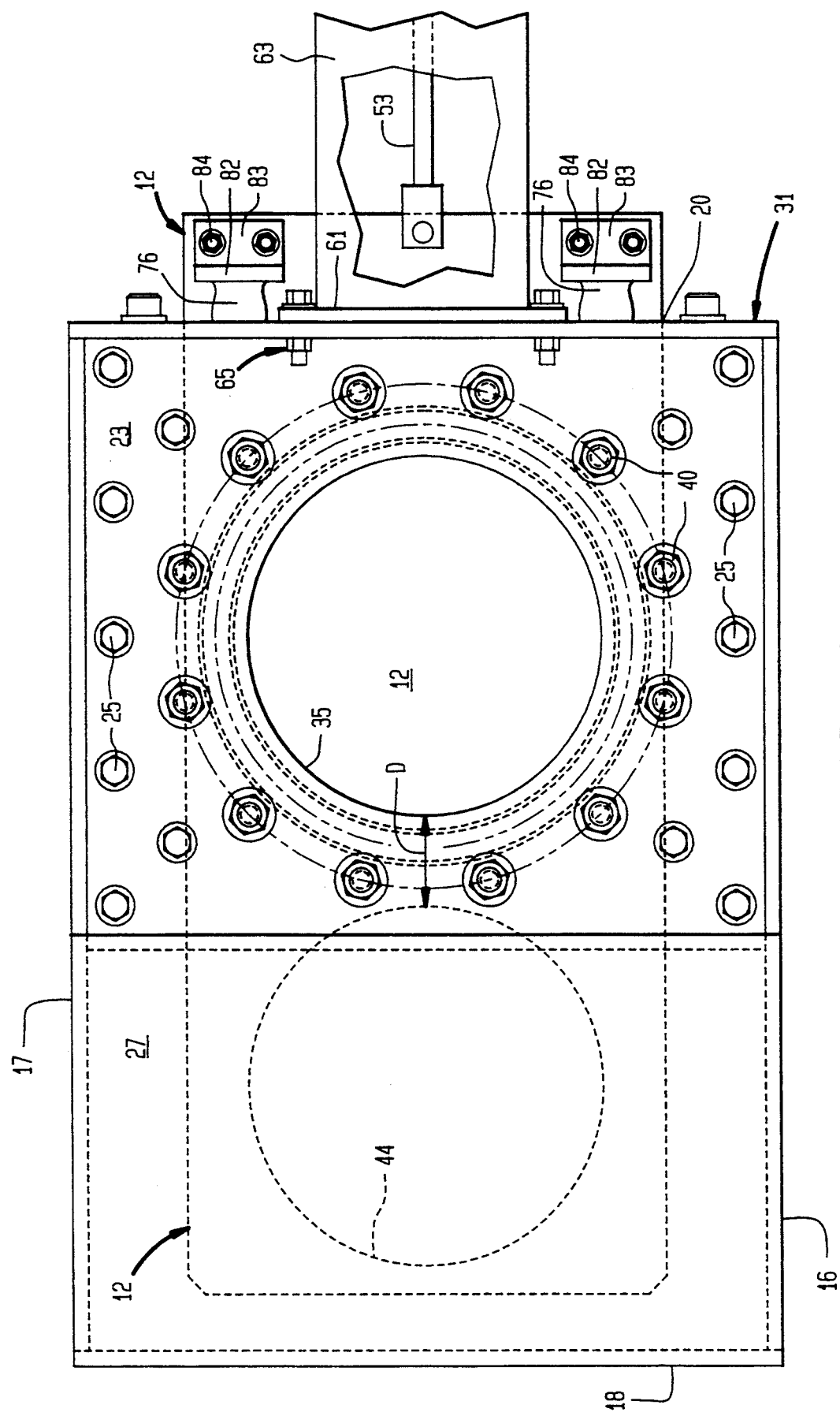
FIG. 2 is a plan view of the gate valve shown in FIG. 1.
Figure 3:
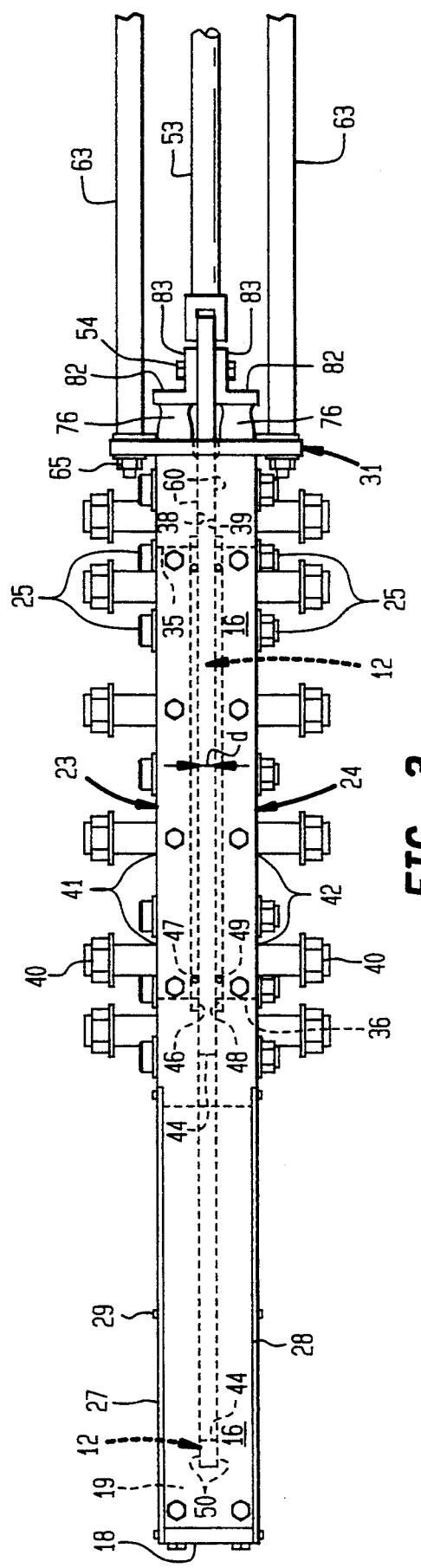
FIG. 3 is a side view of the gate valve shown in FIGS. 1 and 2.

Because the closure force produced by the actuator mechanism 14 includes only components parallel to the engaged planar surfaces of the gate plate 12 and the valve housing plates 23, 24, extremely fast closure speeds can be attained. The rapid closure speed is made possible by the overtravel of the gate plate 12 during a closure cycle. Gate plate over travel is facilitated by the use of planar surface to planar surface seals between the gate 12 and the valve plates 23, 24 which do not require specific alignments for a sealed closure. Extremely, rapid closure of the gate valve 11 is facilitated by providing for sufficient over travel of the gate plate 12 to result in separation of the circular throughput opening 44 from the inlet and outlet openings 35, 36 by a distance D equal to at least 5% of the maximum width (diameter) of the throughput opening 44 and preferably greater than 20% thereof as shown in FIG. 2. Rapid closure of the valve 11 is further enhanced by engagement between the bracket stops 77 and the bumper stops 76 which are resiliently compressed to decelerate the gate 12 and dissipate its momentum only after full closure thereof as also shown in FIG. 2.

Obviously, many modifications and variations of the present invention are possible in light of the above teachings. It is to be understood, therefore, that the invention can be practiced otherwise than as specifically described.

What is claimed is:

1. Gate valve apparatus comprising:
    valve housing means defining an inlet and an outlet aligned therewith; said housing means comprising a planar inlet surface surrounding said inlet and a planar outlet surface surrounding said outlet and parallel to, facing and spaced a given distance from said inlet surface;
    a gate plate having a uniform thickness substantially equal to said given distance and defining a throughput opening, said gate plate mounted for sliding movement between said inlet and outlet surfaces and between an open position wherein said throughput opening is aligned with said inlet and said outlet and a closed position wherein said throughput opening is transversely displaced from said inlet and said outlet;
    actuator means for producing rectilinear movement of said gate plate between said open and closed positions and wherein said throughput opening has a maximum width in said direction of rectilinear movement, and in said closed position of said gate plate said actuator means produces between said throughput opening and said inlet and said outlet a transverse displacement equal to at least 5% of said maximum width; and
    deceleration means operable to induce deceleration of said gate plate only during movement thereof that produces said transverse displacement of said throughput opening.

2. Gate valve apparatus according to claim 1 wherein said gate plate has planar opposite surfaces each of which define a first annular gate seal surface surrounding said throughput opening and a second annular gate seal surface transversely spaced from said first annular gate seal surface; and said planar inlet and outlet surfaces engage, respectively, said first annular gate seal surfaces in said open position and said second annular gate seal surfaces in said closed position.

3. Gate valve apparatus according to claim 2 wherein said actuator means produces on said gate plate a closure force having only components parallel to said inlet and outlet surfaces.

4. Gate valve apparatus according to claim 3 wherein said inlet, said outlet and said throughput openings are circular and of substantially equal diameter.

5. Gate valve apparatus according to claim 4 wherein in said closed position of said gate plate said transverse displacement of said throughput opening is equal to greater than 20% of said maximum width.

6. Gate valve apparatus according to claim 5 wherein said deceleration means comprises resilient means for engaging said gate plate so as to induce deceleration thereof only after movement of said gate plate into a position transversely displacing said throughput opening from said inlet and said outlet.

7. Gate valve apparatus according to claim 6 wherein said actuator means comprises a cylinder, a piston slidably retained within said cylinder and coupled to said gate plate, and a source of pressurized gas communicating with said cylinder.

8. Gate valve apparatus according to claim 1 wherein in said closed position of said gate plate said transverse displacement of said throughput opening is equal to greater than 20% of said maximum width.

9. Gate valve apparatus according to claim 8 wherein said gate plate has planar opposite surfaces each of which define a first annular gate seal surface surrounding said throughput opening and a second annular gate seal surface transversely spaced from said first annular gate seal surface; and said planar inlet and outlet surfaces engage, respectively, said first annular gate seal surfaces in said open position and said second annular gate seal surfaces in said closed position.

10. Gate valve apparatus according to claim 9 wherein said actuator means produces on said gate plate a closure force having only components parallel to said inlet and outlet surfaces.

11. Gate valve apparatus according to claim 10 wherein said inlet, said outlet and said throughput openings are circular and of substantially equal diameter.

12. Gate valve apparatus according to claim 11 wherein said deceleration means comprises resilient means for engaging said gate plate so as to induce deceleration thereof only after movement of said gate plate into a position transversely displacing said throughput opening from said inlet and said outlet.

13. Gate valve apparatus according to claim 12 wherein said actuator means comprises a cylinder, a piston slidably retained within said cylinder and coupled to said gate plate, and a source of pressurized gas communicating with said cylinder.

14. Gate valve apparatus according to claim 1 wherein said deceleration means comprises resilient means for engaging said gate plate so as to induce deceleration thereof only after movement of said gate plate into a position transversely displacing said throughput opening from said inlet and said outlet.

15. Gate valve apparatus according to claim 14 wherein said gate plate has planar opposite surfaces each of which define a first annular gate seal surface surrounding said throughput opening and a second annular gate seal surface transversely spaced from said first annular gate seal surface; and said planar inlet and outlet surfaces engage, respectively, said first annular gate seal surfaces in said open position and said second annular gate seal surfaces in said closed position.

16. Gate valve apparatus according to claim 15 wherein said inlet, said outlet and said throughput openings are circular and of substantially equal diameter.

17. Gate valve apparatus according to claim 16 wherein said actuator means comprises a cylinder, a piston slidably retained within said cylinder and coupled to said gate plate, and a source of pressurized gas communicating with said cylinder.

18. Gate valve apparatus according to claim 1 wherein said actuator means comprises a cylinder, a piston slidably retained within said cylinder and coupled to said gate plate, and a source of pressurized gas communicating with said cylinder.

19. Gate valve apparatus according to claim 18 wherein in said closed position of said gate plate said transverse displacement of said throughput opening is equal to greater than 20% of said maximum width.

20. Gate valve apparatus according to claim 18 wherein said deceleration means comprises resilient means for engaging said gate plate so as to induce deceleration thereof only after movement of said gate plate into a position transversely displacing said throughput opening from said inlet and said outlet.

* * * * *